(12) United States Patent
Gilliland et al.

(10) Patent No.: US 6,350,063 B1
(45) Date of Patent: Feb. 26, 2002

(54) PLUGGABLE OPTICAL TRANSCEIVER MODULE HAVING A HIGH SPEED SERIAL DATA CONNECTOR (HSSDC)

(75) Inventors: Patrick B. Gilliland, Chicago; Carlos Jines, Forest Park, both of IL (US)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 09/458,846

(22) Filed: Dec. 13, 1999

(51) Int. Cl.$^7$ .............................. G02B 6/36; H04B 10/00
(52) U.S. Cl. ................... 385/88; 385/385; 385/89; 385/92; 385/139; 359/154; 359/152
(58) Field of Search ................. 385/88, 89, 92, 385/139, 94; 439/76.1; 359/154, 152

(56) References Cited

U.S. PATENT DOCUMENTS

| | | | |
|---|---|---|---|
| 5,481,634 A | 1/1996 | Anderson et al. | 385/76 |
| 5,528,408 A | 6/1996 | McGinley et al. | 359/163 |
| 5,546,281 A | 8/1996 | Poplawski et al. | 361/752 |
| 5,638,390 A | 6/1997 | Gilliland et al. | 372/38 |
| 5,717,533 A | 2/1998 | Poplawski et al. | 361/752 |
| 5,766,027 A | 6/1998 | Fogg | 439/76.1 |
| 5,864,468 A | 1/1999 | Poplawski et al. | 361/753 |
| 5,865,646 A | 2/1999 | Ortega et al. | 439/607 |
| 5,879,173 A | 3/1999 | Poplawski et al. | 438/138 |
| 5,966,487 A | 10/1999 | Gilliland et al. | 385/92 |
| 5,991,931 A * | 11/1999 | Lee et al. | 710/33 |
| 6,179,627 B1 * | 1/2001 | Daly et al. | 439/76.1 |
| 6,188,702 B1 * | 2/2001 | Tornetta et al. | 370/535 |
| 6,203,333 B1 * | 3/2001 | Medina et al. | 439/76.1 |
| 6,220,873 B1 * | 4/2001 | Samela et al. | 439/76.1 |

OTHER PUBLICATIONS

AMP Incorporated, "Product Specification: Connector, High Speed Serial Data," 108–1705, EC 0990–0847–98, Rev. A, Jul. 13, 1998.

Compaq Computer Corporation, "White Paper: Fibre Channel Technology: Understanding Fiber Cabling and Connecting to Building Infrastructure," Mar. 1998.

SFF Committee, SFF-8420 Specification for HSSDC-1 Shileded Connections, Rev 7.1. Nov. 10, 1998.

TIA/EIA, "Focis 10, Fiber Optic Intermateability Standard, (Draft),"PN-4133, TIA/EIA-604-10.

ANCOT Corporation, "What is Fibre Channel?" Second Ediation, 1995, Menlo Park, California.

Vitesse Semiconductor Corporation, "Design Guide, Fibre Channel Transceivers," Data Sheet, p. 13, Jun. 19, 1998.

* cited by examiner

Primary Examiner—Brian Healy
(74) Attorney, Agent, or Firm—Karl D. Kovach

(57) ABSTRACT

A pluggable optical transceiver module includes two optoelectronic devices mounted to a printed circuit board, and a High Speed Serial Data Connector connected to the printed circuit board. The printed circuit board, and associated optoelectronic devices and the High Speed Serial Data Connector being mounted in a housing. One of the two optoelectronic devices is a transmitter. The other of the two optoelectronic devices is a receiver. The pluggable optical transceiver module converts optical signal to electrical signals, and, also, converts electrical signals to optical signals. The High Speed Serial Data Connector is pluggable into a High Speed Serial Data Connector receptacle of a host device. Another portion of the module may have ports for receiving LC style fiber optic connectors.

12 Claims, 18 Drawing Sheets

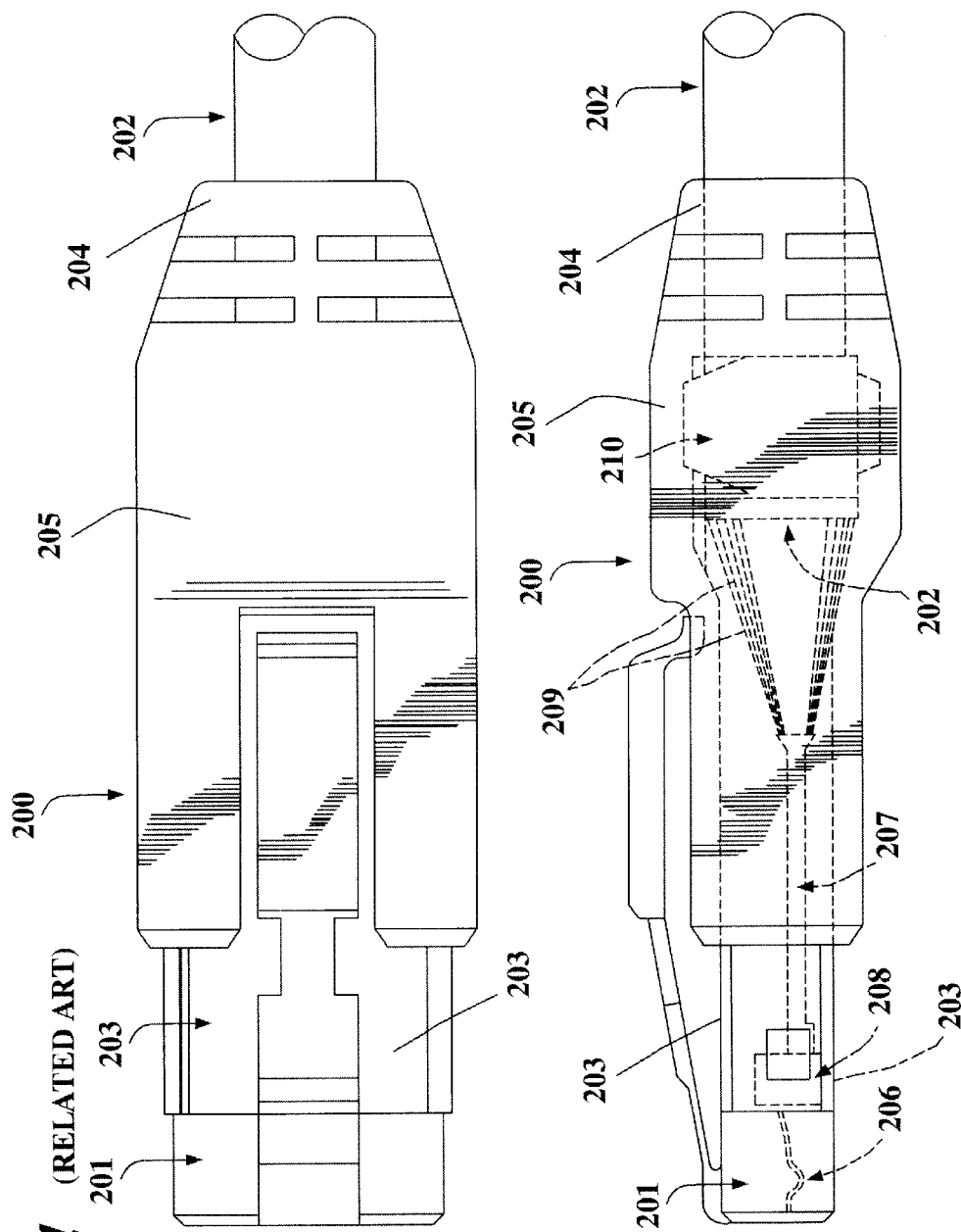

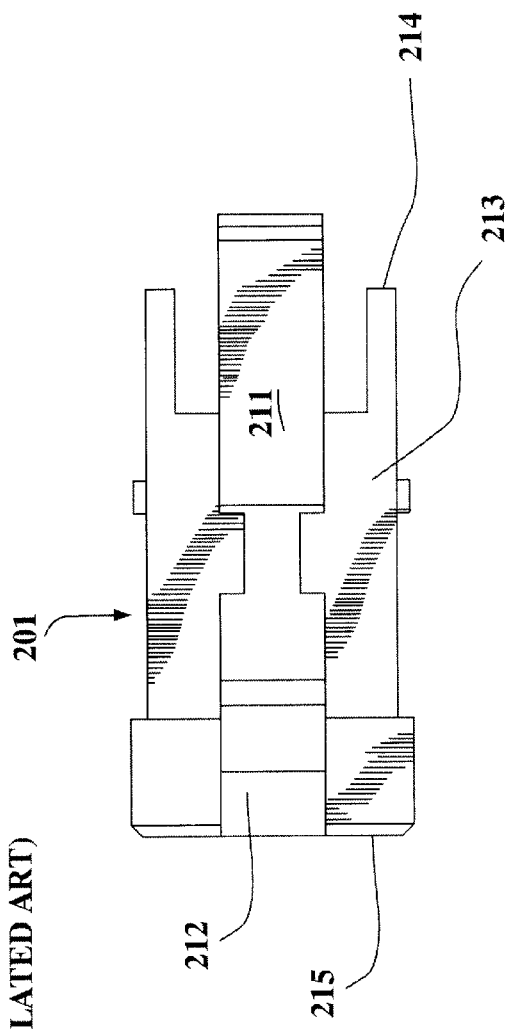
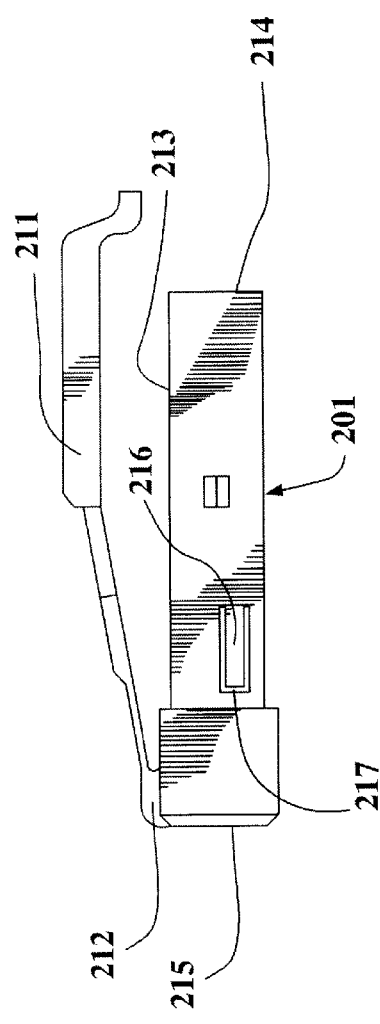
Fig. 6 (RELATED ART)
Fig. 7 (RELATED ART)

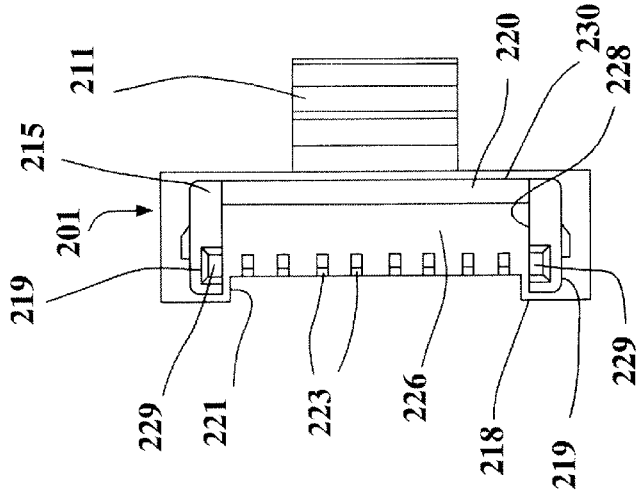
Fig. 10 (RELATED ART)
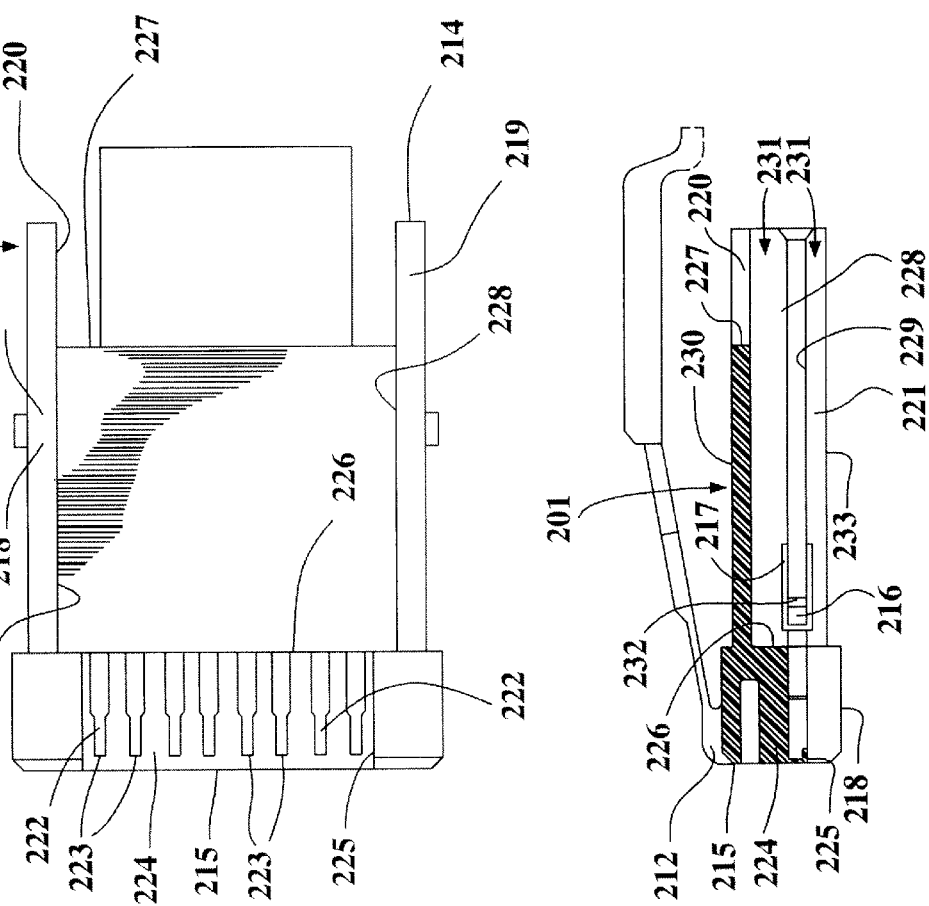
Fig. 9 (RELATED ART)
Fig. 8 (RELATED ART)

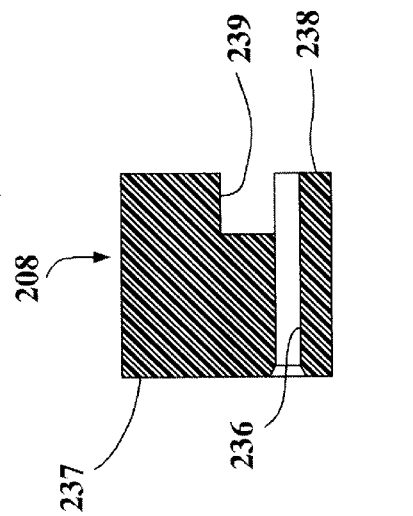
Fig. 13 (RELATED ART)
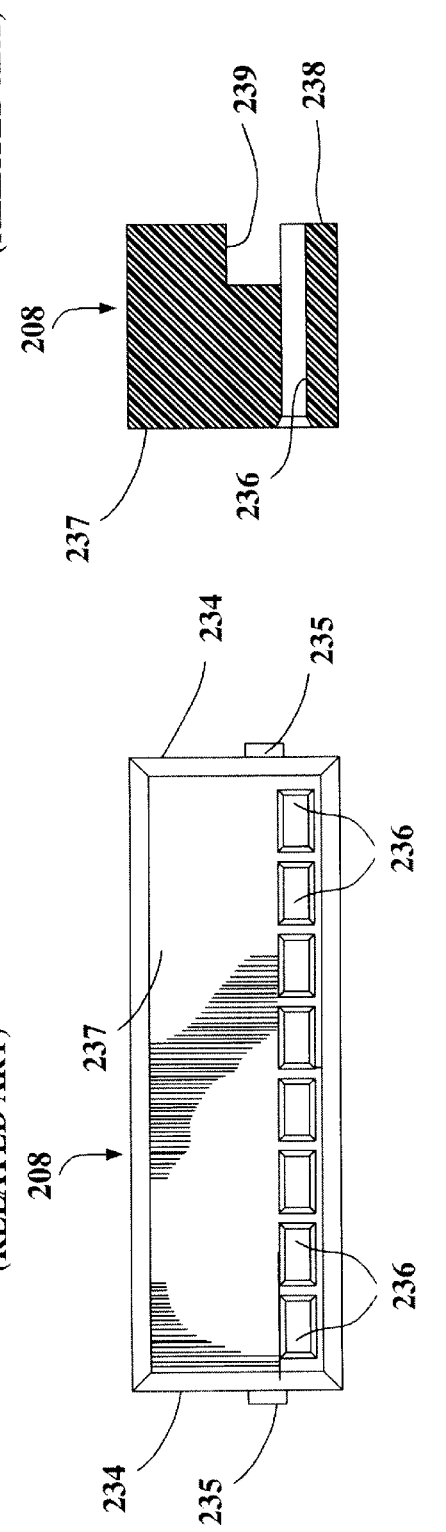
Fig. 11 (RELATED ART)
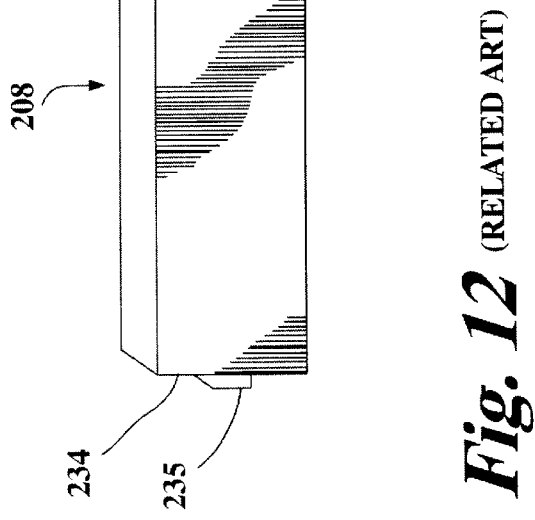
Fig. 14 (RELATED ART)
Fig. 12 (RELATED ART)

*Fig. 31* (RELATED ART)
*Fig. 32* (RELATED ART)
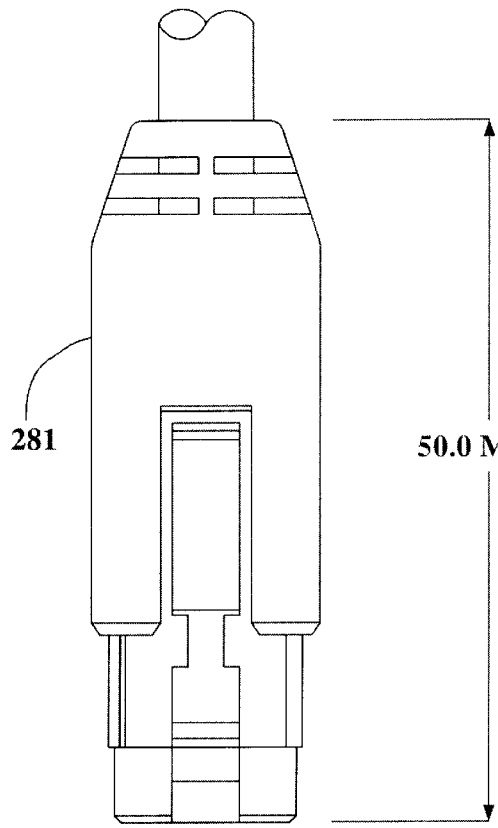
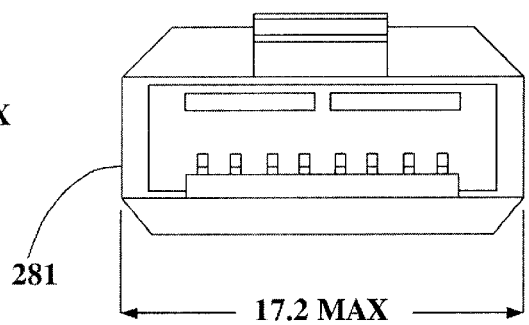
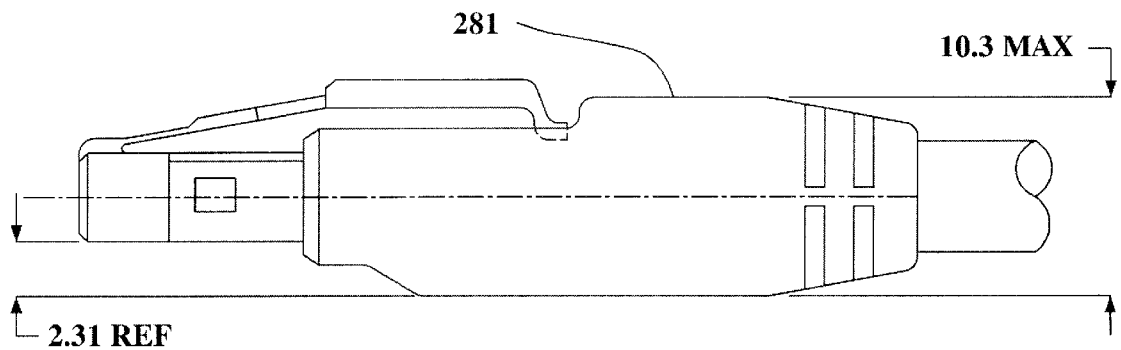
*Fig. 33* (RELATED ART)

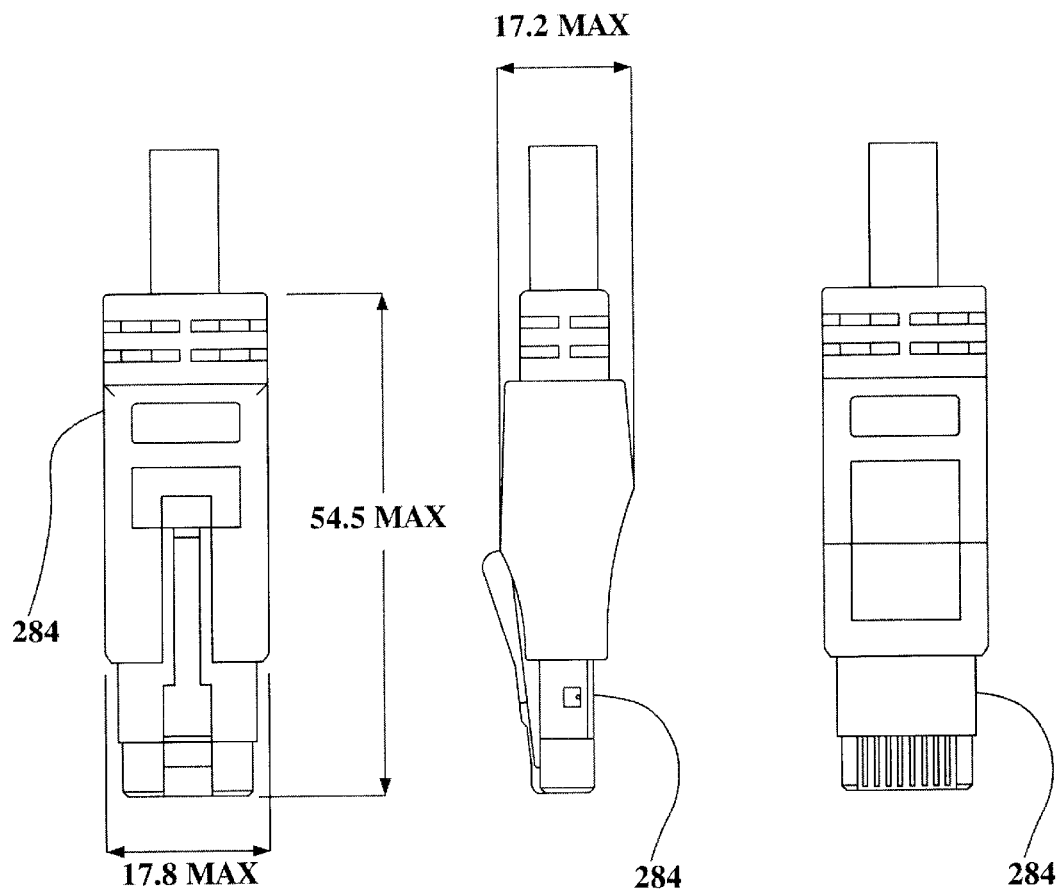

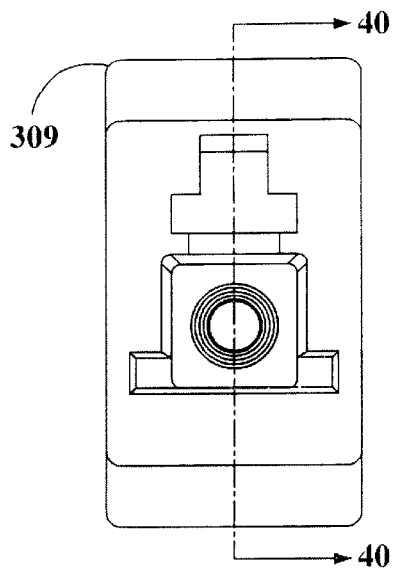
(RELATED ART)
*Fig. 39*
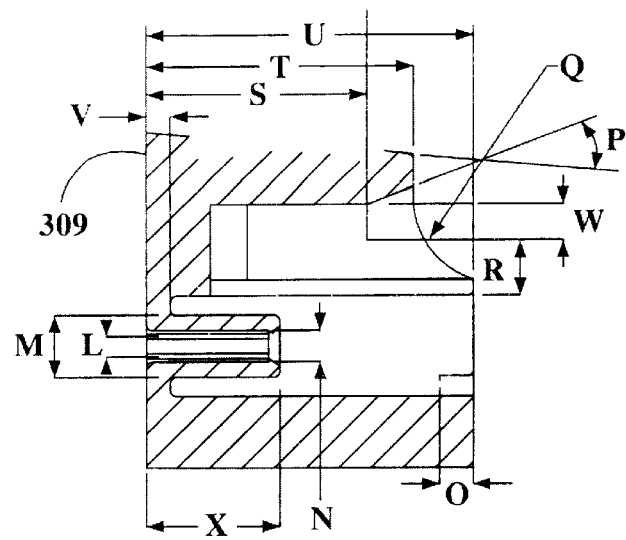
(RELATED ART)
*Fig. 40*
| DIM | MIN. (mm) | MAX. (mm) |
|---|---|---|
| L | - | - |
| M | 2.87 | 2.97 |
| N | 1.4 | 1.5 |
| O | 1.9 | - |
| P | 15 | - |
| Q | 2.2 | 2.4 |
| R | 1.8 | 2.0 |
| S | 9.9 | 10.0 |
| T | 12.6 | 12.8 |
| U | 14.5 | 14.7 |
| V | 0.6 | 0.7 |
| W | 1.0 | 1.1 |
| X | 4.0 | 4.1 |
*Fig. 41* (RELATED ART)

PLUGGABLE OPTICAL TRANSCEIVER MODULE HAVING A HIGH SPEED SERIAL DATA CONNECTOR (HSSDC)

BACKGROUND OF THE INVENTION

1. Field of the Invention

The present invention relates to a transceiver module. The transceiver module is configured to convert data signals from a first serial transmission medium to a second serial transmission medium. The invention more particularly concerns an optical transceiver module having a High Speed Serial Data Connector which is pluggable, for instance, into a host device.

2. Discussion of the Background

Computer networks and channels are constantly evolving in an effort to transmit more data faster over longer distances without the data being corrupted. At the same time the structure of the system needs to be simplistic and uniform so as to increase standardization and interchangeability. In an effort to address the problem, a committee for Fibre Channel was formed which published an American National Standards Institute (ANSI) standard, ANSI X3T11. Development of Fibre Channel standards are continuing. Other sources of Fibre Channel information can be found in "What is Fibre Channel?," by Jan Dedek and Gary Stephens, Fourth Edition, 1999, ANCOT Corporation, and "Fibre Channel, Volume 1: The Basics," by Jan Dedek and Gary Stephens, 1995, ANCOT Corporation. Fibre Channel is a melding of traditional network and channel philosophies. Fibre Channel is a standard which has as a goal the high speed transfer of uncorrupted data over long and short distances at a reasonable price. Fibre Channel uses links to connect to ports of a node. Typically, a copper cable or an optical fiber is the link. A node represents a device such as a disk drive, a printer, a work station, a host device, etc. The port of the node is the input/output interface. Fibre Channel requires that each node have at least one port, and that each port have a first fiber for transporting data to the node and a second fiber for transporting data from the node.

High speed transmission of data over a copper cable link or an optical fiber link is suitable over relatively short distances of approximately twenty-five meters. Copper cable links are not suitable for transmitting data past distances of approximately twenty-five meters due to loss of signal power without using a relay to boost power. Contrastingly, optical fiber links transmit data with acceptable power loss up to distances of approximately ten kilometers. However, copper cable links are less expensive than optical fiber links. Conmmonly, copper cable links are terminated with either a DB-9 connector or a High Speed Serial Data Connector (HSSDC); and fiber optic cable links are terminated with a Fibre Channel approved SC connector.

Many of the nodes have ports which accept copper cable links and as such have DB-9 or HSSDC connector receptacles, or the ports accept fiber optic cable connectors and as such have SC connector receptacles. The hardware of the ports are, typically, permanently mounted to the printed circuit board or chassis of the node. Thus, nodes exist having ports which accept either only a copper cable link or an optical fiber link.

Typically, businesses begin small and grow larger. So, it is reasonable that a new businessperson investing in Fibre Channel technology would purchase copper cable link compatible nodes, since the new businessperson does not have large distances over which to transmit data between nodes. Over time, the businessperson's venture grows as does the businessperson's need for transmitting data between nodes which are separated by long distances. Such a situation is distressing to the businessperson who has invested large amounts of resources in a copper cable link based system. The businessperson must now purchase optical fiber link compatible nodes and optic fiber links. Such an outlay of capital is not desired. It is desirous to salvage the copper cable link compatible nodes to be used with the optical fiber links. This may be true for other area networks in addition to Fibre Channel.

As further background, a High Speed Serial Data Connector (HSSDC) is disclosed in U.S. Pat. No. 5,766,027, which is hereby incorporated herein by reference. Such a High Speed Serial Data Connector is shown in FIGS. 4–17. Industrial technical standard documents ANSI X3TI 1/FC-0, ANSI X3TII, and ANSI X3T10.1 specify requirements of the High Speed Serial Data Connector. FIG. 4 is a top view of an ANSI approved High Speed Serial Data Connector 200. FIG. 5 is a side view of the ANSI approved High Speed Serial Data Connector 200. FIGS. 4 and 5 show a housing 201, an electrical cable 202, a conductive shield 203, a bending strain relief 204, and an insulating overmold 205. FIG. 5 further shows contacts 206, a circuit board 207, a holder 208, conductors 209, and a strain relief 210. FIG. 6 is a top view of the housing 201. The housing 201 includes a latch arm 211, a front end 212, a top side 213, a rear 214, and a front mating end 215. FIG. 7 is a side view of the housing 201. FIG. 7 further shows a latch finger 216, and a slit 217. FIG. 8 is a side view, partially in section, of the housing 201. FIG. 8 further shows a bottom side 218, a second window 220, a first window 221, channels 223, a tongue 224, an opening 225, a front wall 226, a cavity 228, grooves 229, an open top side 230, air gaps 231, a ramped projection 232, a bottom side 233. FIG. 9 further shows sides 219, a front portion 222, and an end wall 227. FIG. 10 is an end view of the housing 201. FIG. 11 is a front view of the holder 208. The holder 208 includes exterior ends 234, projecting tapered latch fingers 235, passages 236, and a front end 237. FIG. 12 is a top view of the holder 208. FIG. 13 is a section view of the holder 208 further showing a rear end 238, and a recess 239. FIG. 14 is an end view of the holder 208. FIG. 15 is a top view of the electrical contacts 206 further showing a carrier strip 240, and narrow tips 241. FIG. 16 is an edgewise view of one of the contacts 206 further showing various bends 242. FIG. 17 is an edgewise view of the combination of the contacts 206 and the holder 208 and further showing a front edge 243 of the circuit board 207.

Additionally, a High Speed Serial Data Connector receptacle is disclosed in U. S. Pat. No. 5,865,646, which is hereby incorporated herein by reference. Such a High Speed Serial Data Connector receptacle is shown in FIGS. 18–20. FIG. 18 is a perspective view of a High Speed Serial Data Connector receptacle 244. FIG. 19 is a front view of the High Speed Serial Data Connector receptacle 244. FIG. 20 is a side view of the High Speed Serial Data Connector receptacle 244. The receptacle 244 includes a insulator 245, a rear wall 246, a plurality of conductive contact terminals 247, a pair of upper guide members 248, a peg 249, a shield 250, a top wall 251, side wall 252, through hole tails 253, side wall 254, a rear wall 255, tabs 256, a latch 257, a chamber 258, a bottom wall 259, another bottom wall 260, a top flange 261, a latch receiving slot 262, a latching shoulder 263, another latching shoulder 264, a top contact member 265, a compliant contact member 266, another compliant contact member 267, another contact 268, a side flange 269, another side flange 270, fingers 271, fingers 272, side contact fingers 273, another flange portion 274, another flange portion 275, contact fingers 276, a bottom contact member 277, through hole tails 278, tails 279, more side contact fingers 280, an insertion axis A1, a front zone B1, and a rear zone C1.

Furthermore, the Small Form Factor Committee has published the "SFF-8420 Specification for HSSDC-1 Shielded Connections, Rev 7.1, non-final draft, Nov. 10, 1998," which sets forth certain requirements of a High Speed Serial Data Connector and a High Speed Serial Data Connector receptacle. Drawings of both the HSSDC connector and the receptacle are shown in FIGS. 21–36. FIGS. 21–24 correspond to FIGS. 3–6 of the SFF-8420 specification. FIGS. 25–27 correspond to FIG. 7 of the SFF-8420 specification. FIGS. 28–30 correspond to FIG. 8 of the SFF-8420 specification. FIGS. 31–33 correspond to FIG. 11 of the SFF-8420 specification. FIGS. 34–36 correspond to FIG. 12 of the SFF-8420 specification. FIG. 21 is a perspective view of mating sides of one version of a High Speed Serial Data Connector 281 and receptacle 282. FIG. 22 is a perspective view of mating sides of another version of a High Speed Serial Data Connectors 284, 284 and receptacle 285. In FIG. 22 two different views of the connector 284 are shown for reasons of clarity. FIG. 23 is a perspective view of a right angle surface mounted High Speed Serial Data Connector receptacle 287 mounted to a printed circuit board 286. FIG. 24 is a perspective view of a straddle mount High Speed Serial Data Connector receptacle 288. FIG. 25 is a top view of the High Speed Serial Data Connector receptacle 287 of FIG. 23. FIG. 26 is a front view of the High Speed Serial Data Connector receptacle 287 of FIG. 23. FIG. 27 is a side view of the High Speed Serial Data Connector receptacle 287 of FIG. 23. FIG. 28 is a top view of the High Speed Serial Data Connector receptacle 288 of FIG. 24. FIG. 29 is a front view of the High Speed Serial Data connector receptacle 288 of FIG. 24. FIG. 30 is a side view of the High Speed Serial Data Connector receptacle 288 of FIG. 24. FIG. 31 is a top view of the one version of the High Speed Serial Data Connector 281 of FIG. 21. FIG. 32 is a front view of the High Speed Serial Data Connector 281 of FIG. 21. FIG. 33 is a side view of the High Speed Serial Data Connector 281 of FIG. 21. FIG. 34 is a top view of the second version of the High Speed Serial Data Connector 284 of FIG. 22. FIG. 35 is a side view of the High Speed Serial Data Connector 284 of FIG. 22. FIG. 36 is a bo ttom view of the High Speed Serial Data Connector 284 of FIG. 22. The dimensions shown in FIGS. 26–35 are expressed in units of millimeters.

Finally, an LC connector is disclosed in U.S. Pat. No. 5,481,634, which is hereby incorporated herein by reference. Such an LC connector is shown in FIGS. 37–38. LC connectors are not Fibre Channel approved connectors. FIG. 37 is a rear, top and left-side perspective view of an LC optical fiber connector 293. FIG. 38 is a front, top right-side perspective view of the LC optical fiber connector 293. The LC optical fiber connector 293 includes a bend limiting strain relief boot 294, a spring latch 295, a shoulder 296, a vertical surface 297, a tingemail groove 298, a tabhead 299, a living hinge 300, a tab 301, a central axis 302, an optical cable 303, a housing 304, a ferrule 305, an end face 306, an opening 307, and a cover 308. The ferrule 305 having a diameter of 1.25 mm. Other standards such as the draft of the "Fiber Optic Connector Intermateability Standard, FOCIS 10, (TIA/EIA-604-10)," published by the Telecommunications Industry Association/Electronics Industry Association (TIA/EIA), further define simplex and duplex connector plugs and adapters so as to ensure that these components mechanically intermate. FIG. 39 is an end view of a typical simplex LC receptacle 309 and FIG. 40 is a cross-sectional side view of the simplex LC receptacle 309 of FIG. 39, and FIG. 41 is a listing, in tabular form, of dimensions associated with the alphabetic designators shown in FIG. 40, where the dimensions are provided in millimeters.

SUMMARY OF THE INVENTION

It is an object of the invention to provide an optical transceiver module which is pluggable.

It is another object of the invention is to provide an optical transceiver module which converts optical signals into electrical signals and transfers such data through a copper cable link style connector into a copper cable link connector receptacle of a node, and where the optical transceiver module accepts electrical signals from the copper cable link connector receptacle of the host device through the copper cable link style connector and then converts such signals into optical signals.

It is still another object of the invention to provide a pluggable optical transceiver module that enables copper cable connector receptacle based nodes to be used with fiber optic links.

It is a further object of the invention to provide a pluggable optical transceiver module which is pluggable into a High Speed Serial Data Connector receptacle of a host device.

It is another object of the invention to provide a pluggable optical transceiver module which has a High Speed Serial Data Connector.

It is still yet another object of the invention to provide a pluggable optical transceiver module into which an LC-style fiber optic connector is mateable.

It is another object of the invention to provide a pluggable optical transceiver module which is inexpensive to produce.

It is still further another object of the invention to provide a pluggable optical transceiver module which is reliable.

In one form of the invention the pluggable optical transceiver module includes two optoelectronic devices, and a High Speed Serial Data Connector connected to the two optoelectronic devices. One of the two optoelectronic devices being a receiver, and the second of the two optoelectronic devices being a transmitter.

In yet another form of the invention, the pluggable optical transceiver module includes a housing, a printed circuit board, two optoelectronic devices connected to the printed circuit board, a High Speed Serial Data Connector connected to the printed circuit board and electrically connected to the two optoelectronic devices, wherein the two optoelectronic devices and the printed circuit board are mounted within the housing.

In still yet another form of the invention, the pluggable optical transceiver module includes a housing, a printed circuit board, two optoelectronic devices connected to the printed circuit board, a connector connected to the printed circuit board and electrically connected to the two optoelectronic devices, wherein the two optoelectronic devices and the printed circuit board are mounted within the housing. Furthermore, a first of the two optoelectronic devices is a transmitter, and a second of the two optoelectronic devices is a receiver. Additionally, the a connector is configured so as to be pluggable with a High Speed Serial Data Connector receptacle of a host device.

Thus, the invention achieves the objectives set forth above. The invention provides an optoelectronic transceiver module which includes a High Speed Serial Data Connector that is pluggable. Thus, nodes or host devices which have link receptacles that are configured to receive copper cable connector links can now be used with fiber optic connector links due to the pluggability and adaptability of the optoelectronic transceiver module. Furthermore, the system is reliable and is low in cost to produce.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a top view of a version of an ANSI compliant High Speed Serial Data Connector;

FIG. 5 is a side view of the High Speed Serial Data Connector of FIG. 4;

FIG. 6 is a top view of a housing comprising a portion of the High Speed Serial Data Connector of FIG. 4;

FIG. 7 is a side view of the housing of FIG. 6;

FIG. 8 is a side view partially in section of the housing of FIG. 6;

FIG. 9 is a bottom view of the housing of FIG. 6;

FIG. 10 is an end view of the housing of FIG. 6;

FIG. 11 is a front view of a holder comprising a portion of the High Speed Serial Data Connector of FIG. 4;

FIG. 12 is a top view of the holder of FIG. 11;

FIG. 13 is a section view of the holder of FIG. 11;

FIG. 14 is an end view of the holder of FIG. 11;

FIG. 31 is a top view of the one version of the High Speed Serial Data Connector of FIG. 21;

FIG. 32 is a front view of the High Speed Serial Data Connector of FIG. 31;

FIG. 33 is a side view of the High Speed Serial Data Connector of FIG. 31;

FIG. 34 is a top view of the second version of the High Speed Serial Data Connector of FIG. 22;

FIG. 35 is a side view of the High Speed Serial Data Connector of FIG. 34;

FIG. 36 is a bottom view of the High Speed Serial Data Connector of FIG. 34;

FIG. 39 is an end view of a typical simplex LC receptacle;

FIG. 40 is a cross-sectional side view of the typical simplex LC receptacle of FIG. 39 taken along section line 40—40 of FIG. 39; and FIG. 41 is a table of permissible dimensions corresponding to the alphabetic designators shown in FIG. 40.

DETAILED DESCRIPTION OF THE PRESENTLY PREFERRED EMBODIMENT

Figure 1:
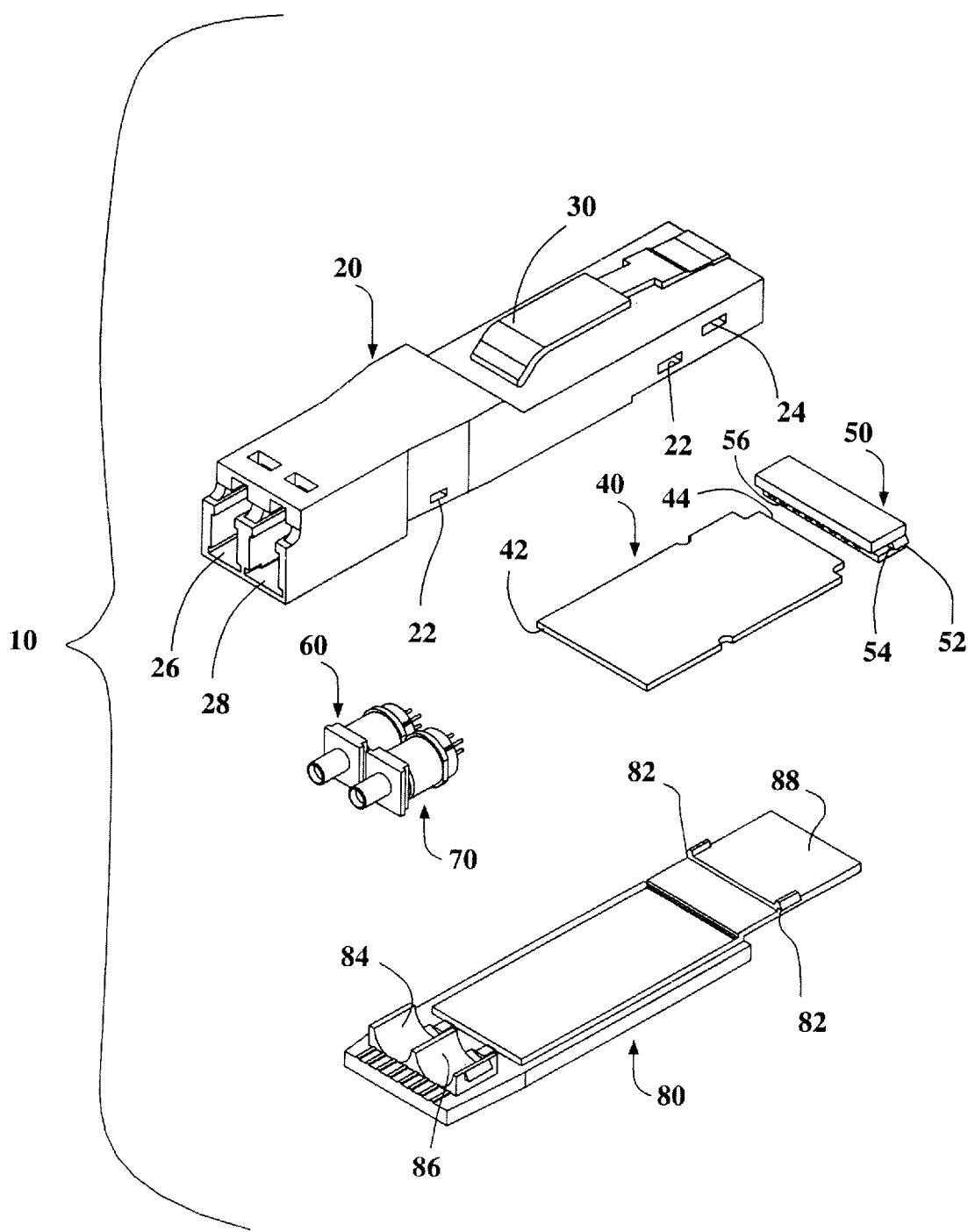
FIG. 1 is an exploded perspective view of one embodiment of a pluggable optical transceiver module where the view is taken from a first direction.
Figure 2:
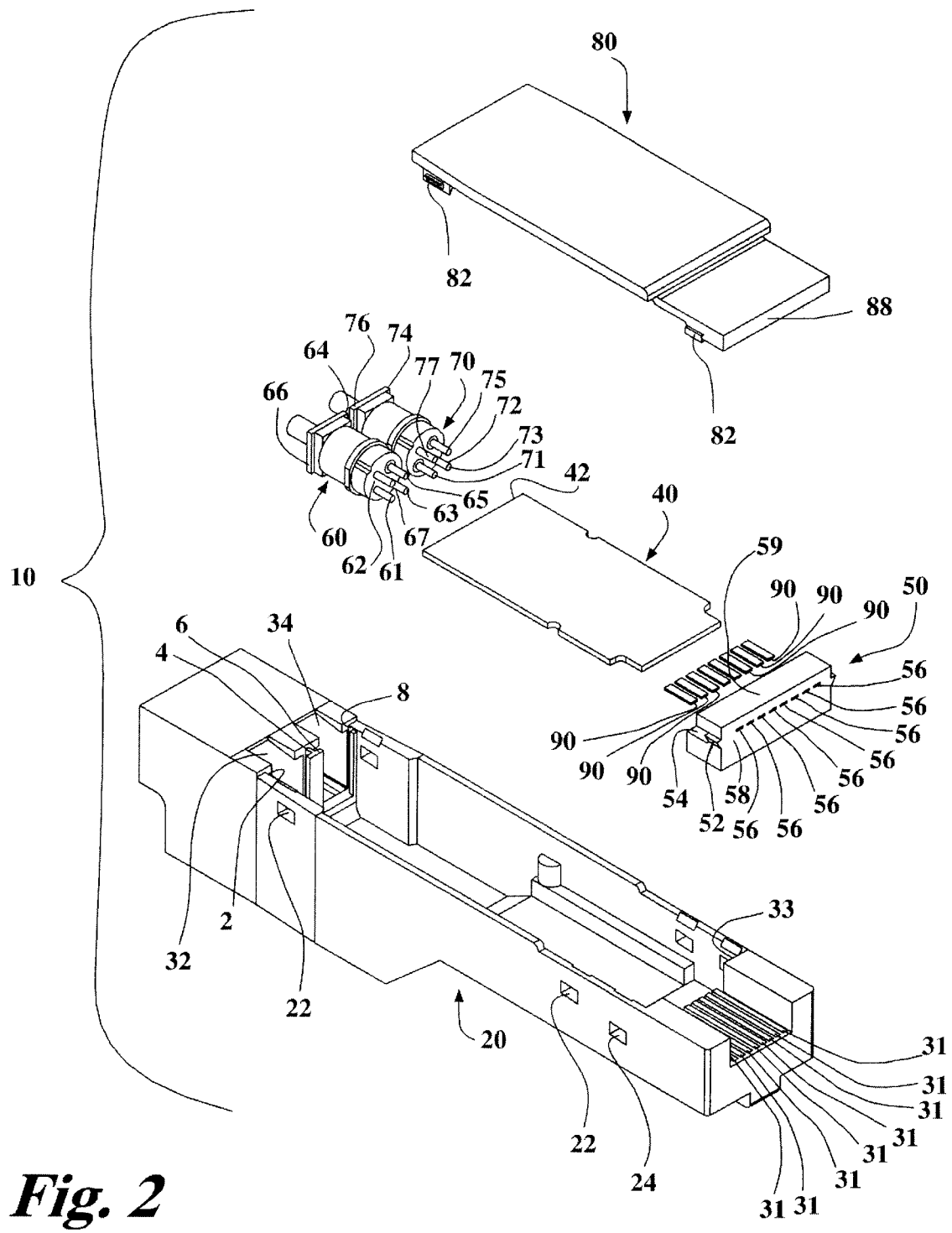
FIG. 2 is an exploded perspective view of the pluggable optical transceiver module of FIG. 1, where the view is taken from a second direction different than the first direction of FIG. 1.
Figure 3:
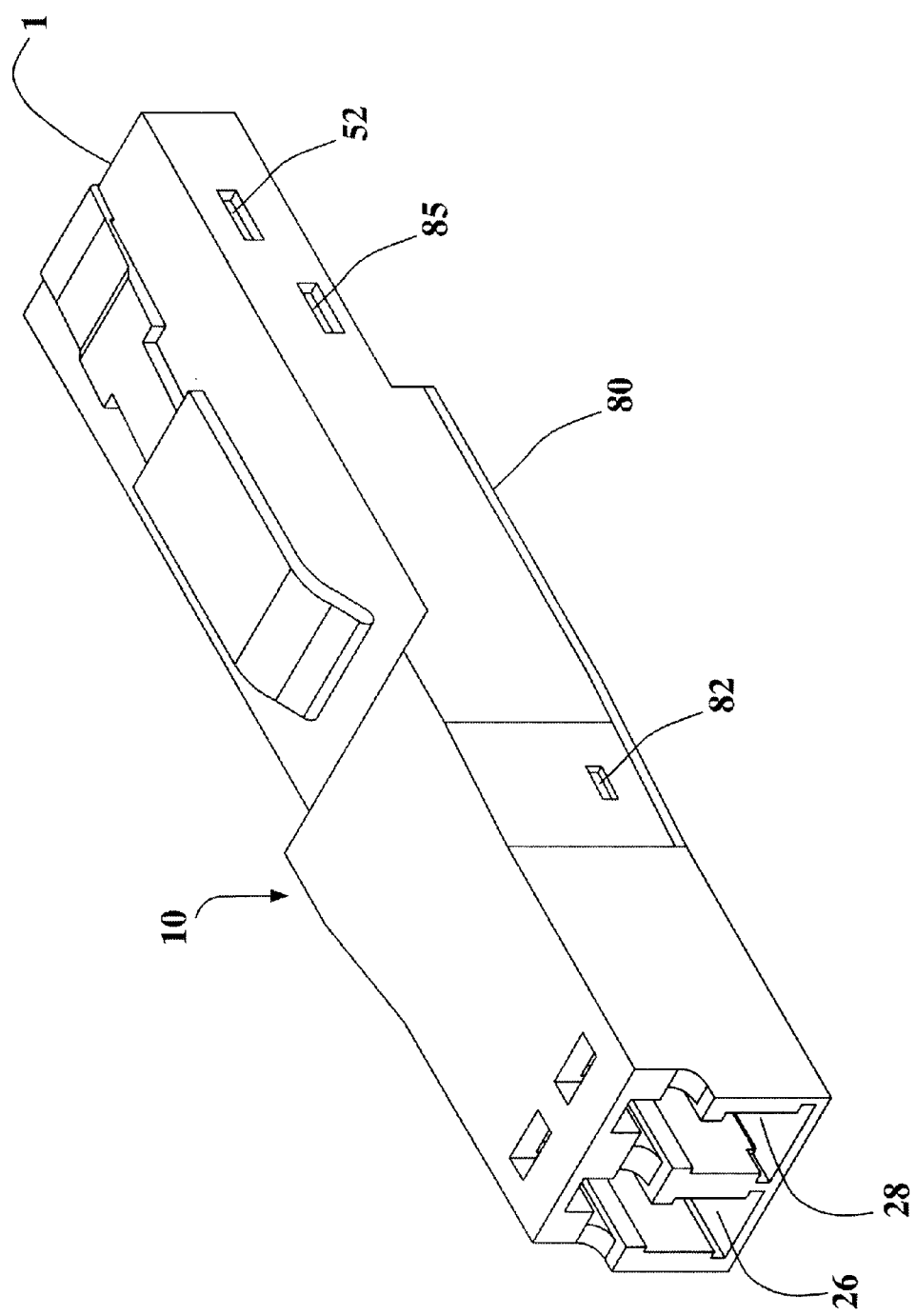
FIG. 3 is a perspective view of the assembled pluggable optical transceiver module of FIG. 1.
Figure 15:
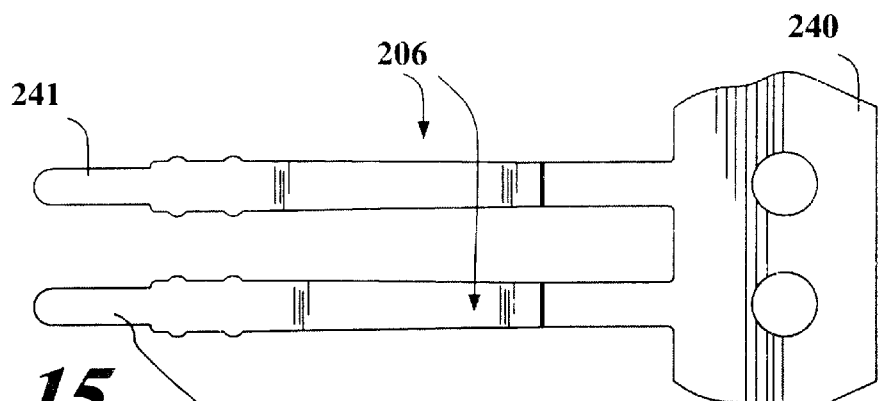
FIG. 15 is a top view of electrical contacts on a removable carrier strip.
Figure 16:
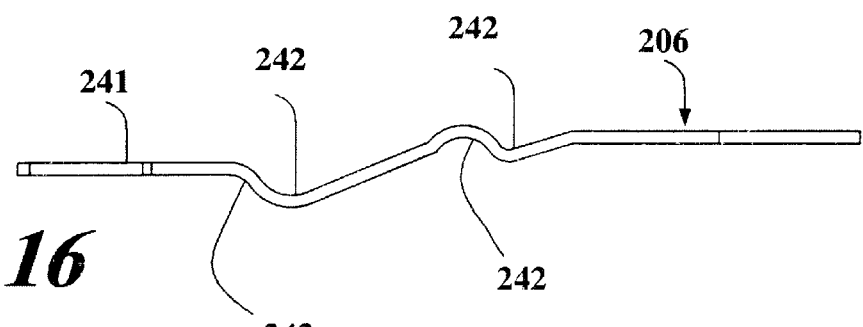
FIG. 16 is an edgewise view of one of the contacts of FIG. 15.
Figure 17:
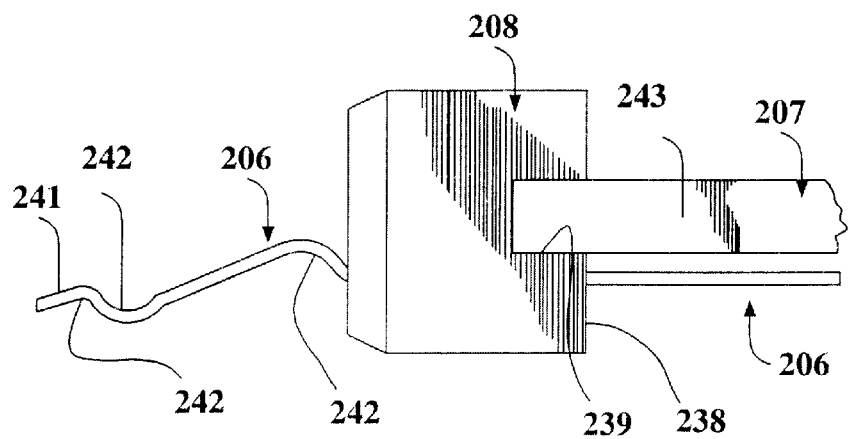
FIG. 17 is a view similar to FIG. 16 and illustrating a holder in combination with multiple contacts of FIG. 15.
Figure 18:
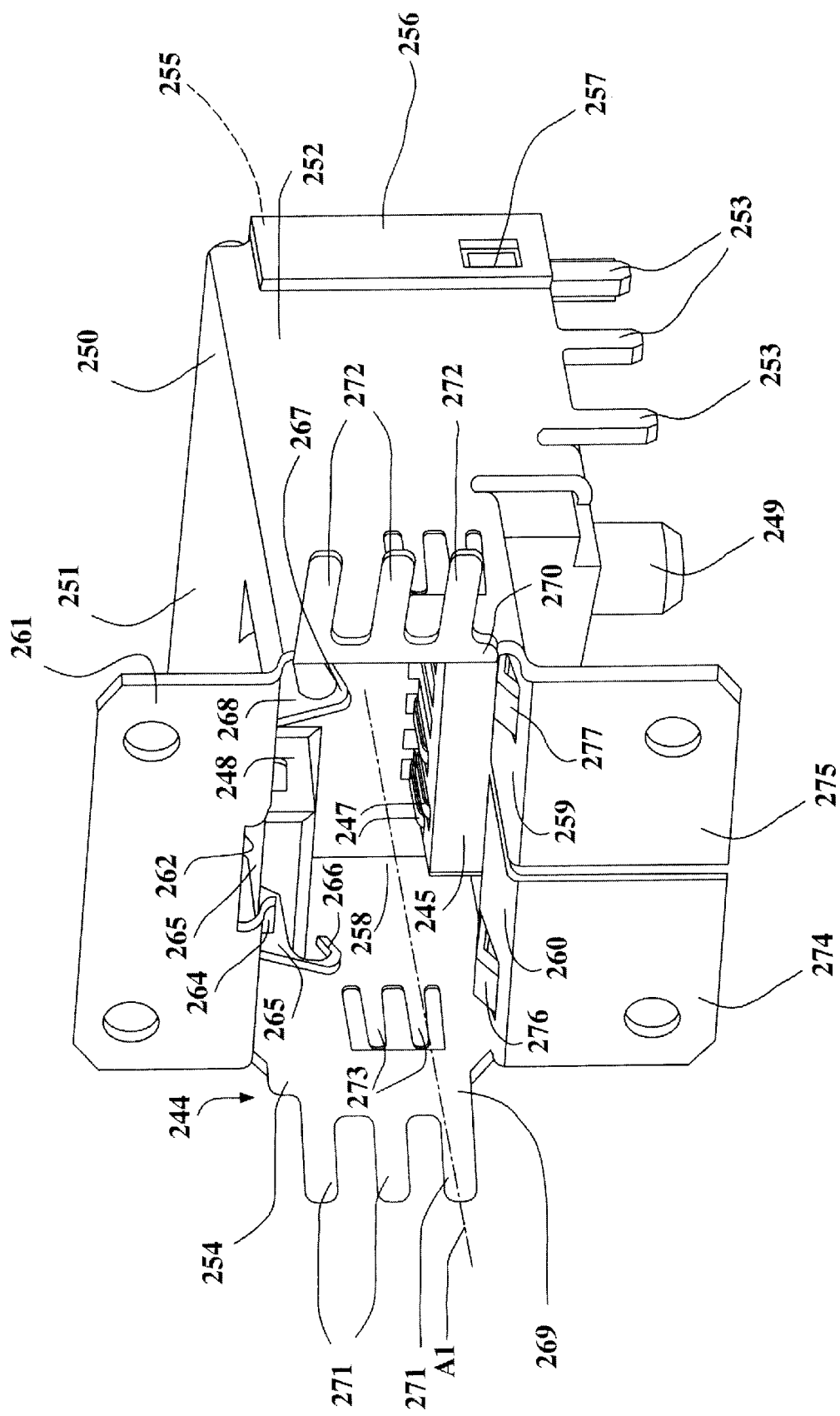
FIG. 18 is a perspective view of a High Speed Serial Data Connector receptacle.
Figure 19:
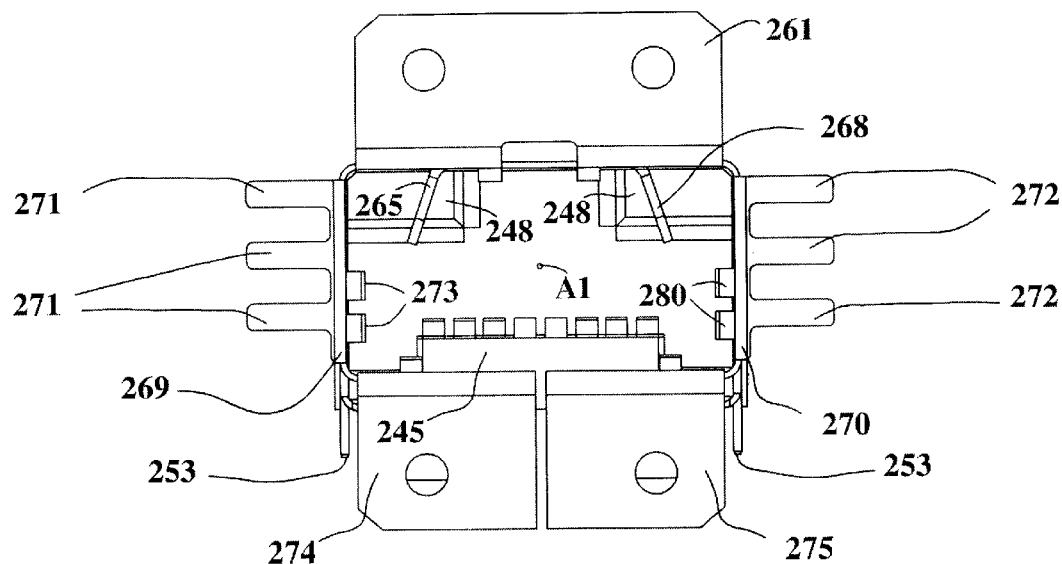
FIG. 19 is a front view of the High Speed Serial Data Connector receptacle of FIG. 18.
Figure 20:
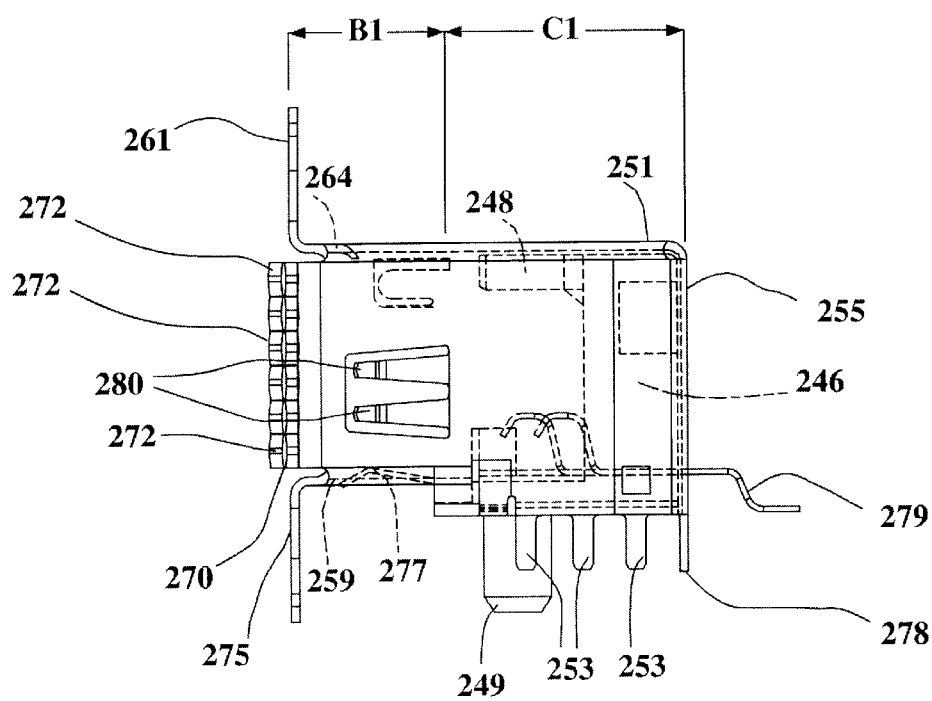
FIG. 20 is a side view of the High Speed Serial Data Connector receptacle of FIG. 18.
Figure 21:
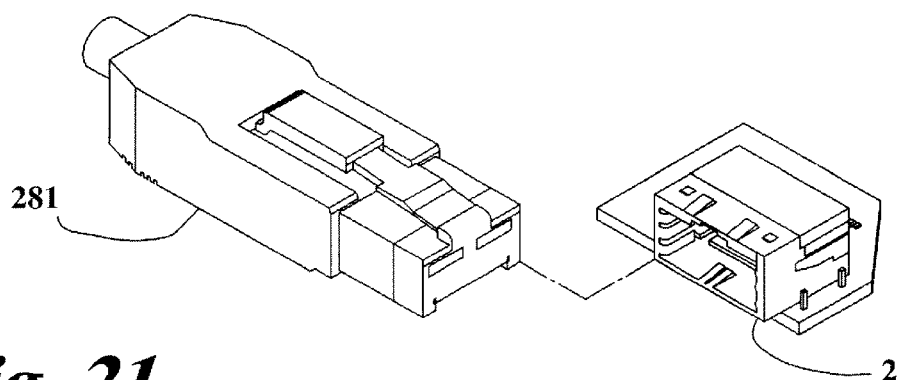
FIG. 21 is a perspective view of mating sides of one version of a High Speed Serial Data Connector and receptacle.
Figure 22:
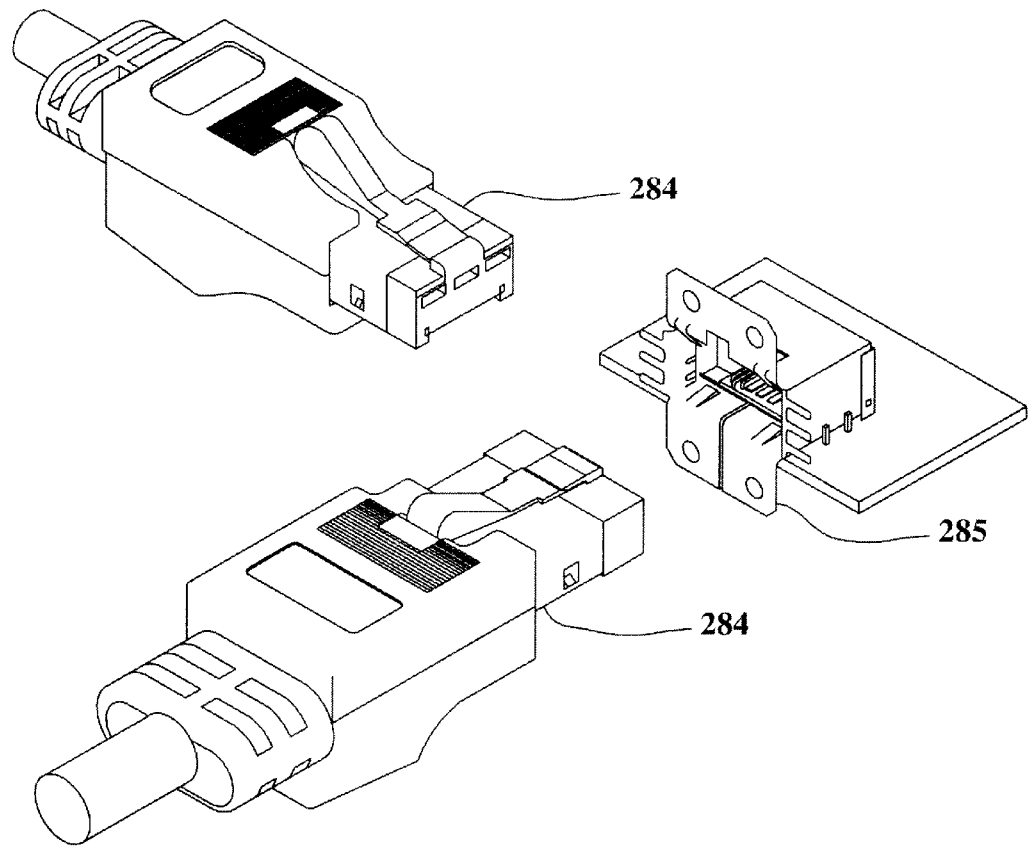
FIG. 22 is a perspective view of mating sides of another version of a High Speed Serial Data Connectors and receptacle.
Figure 23:
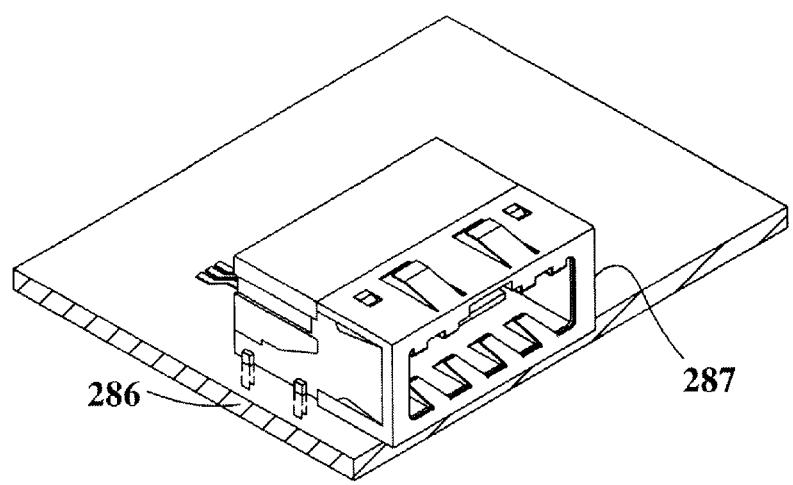
FIG. 23 is a perspective view of a right angle surface mounted High Speed Serial Data Connector receptacle.
Figure 24:
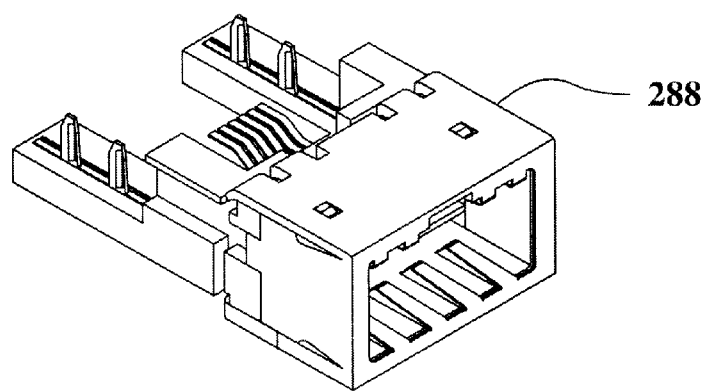
FIG. 24 is a perspective view of a straddle mount High Speed Serial Data Connector receptacle.
Figure 25:
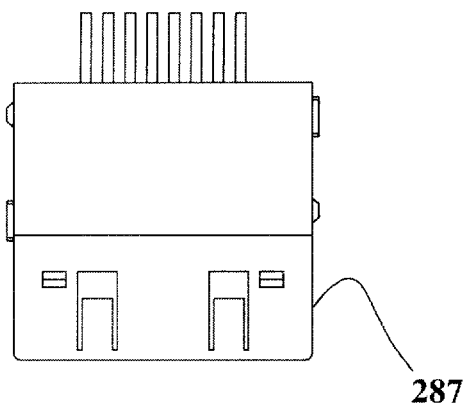
FIG. 25 is a top view of the High Speed Serial Data Connector receptacle of FIG. 23.
Figure 26:
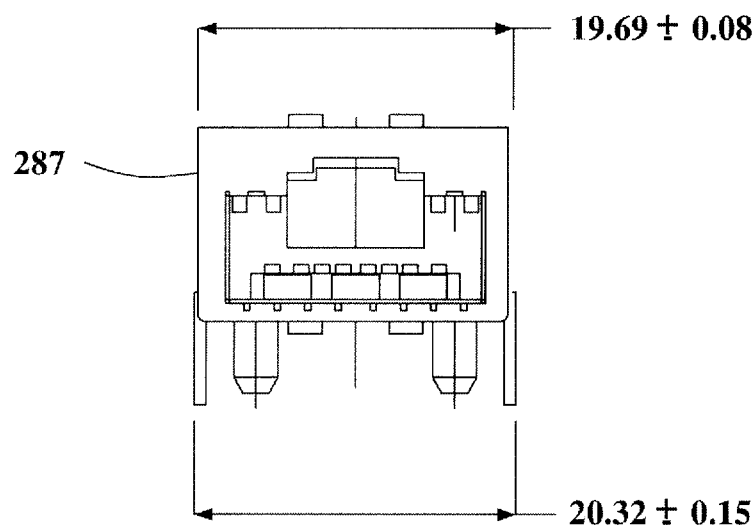
FIG. 26 is a front view of the High Speed Serial Data Connector receptacle of FIG. 23.
Figure 27:
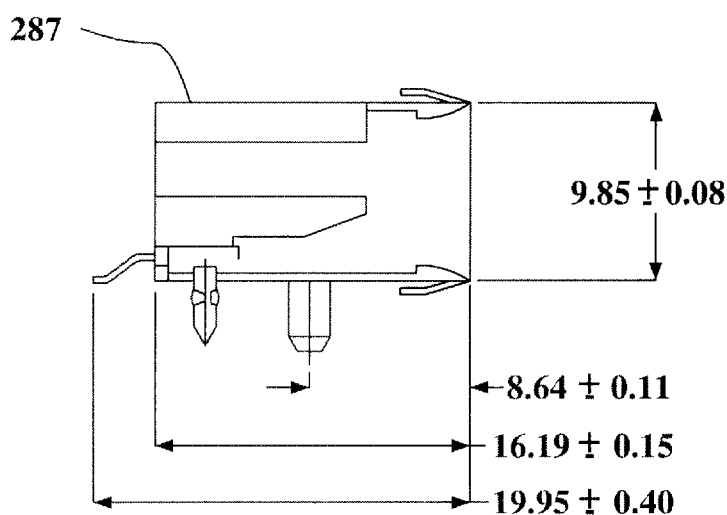
FIG. 27 is a side view of the High Speed Serial Data Connector receptacle of FIG. 23.
Figure 28:
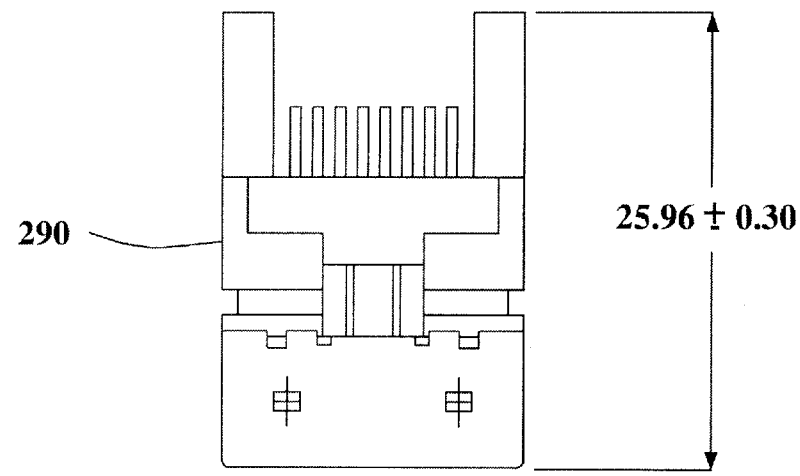
FIG. 28 is a top view of the High Speed Serial Data Connector receptacle of FIG. 24.
Figure 29:
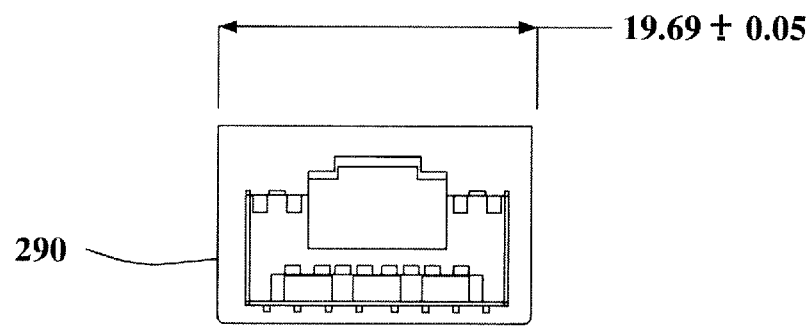
FIG. 29 is a front view of the High Speed Serial Data Connector receptacle of FIG. 24.
Figure 30:
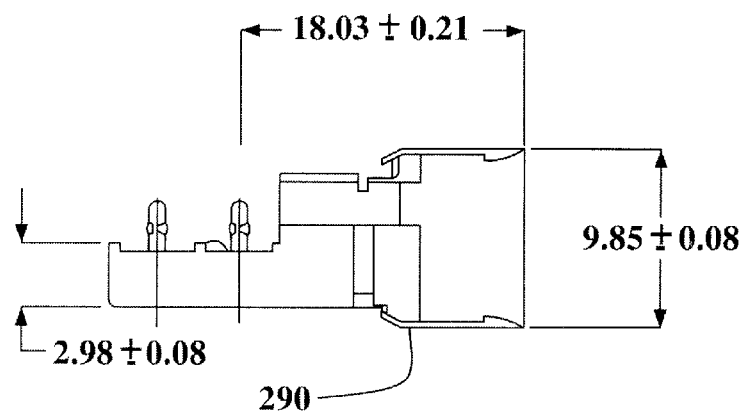
FIG. 30 is a side view of the High Speed Serial Data Connector receptacle of FIG. 24.
Figures 37, 38:
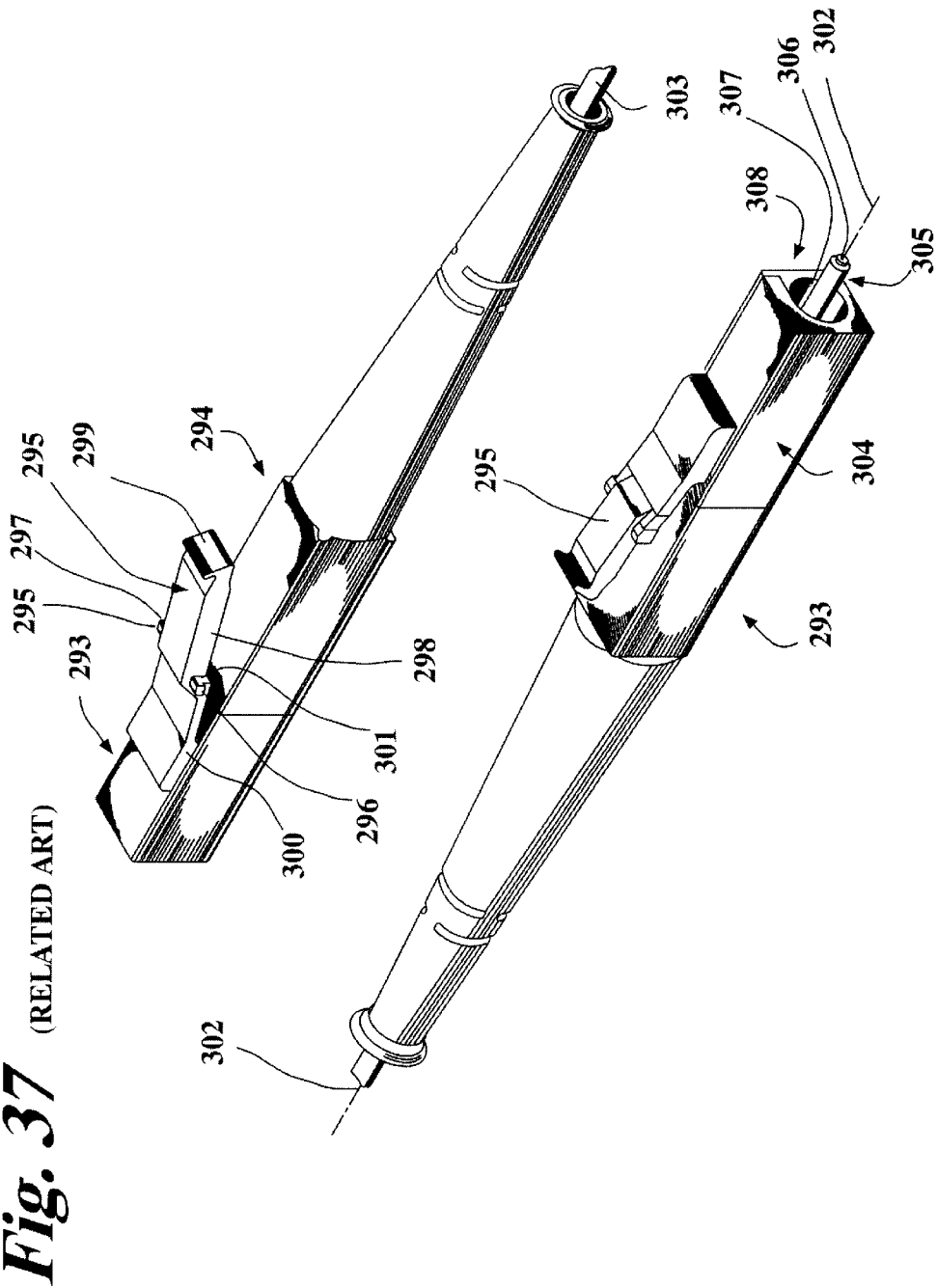
FIG. 37 is a rear, top and left-side perspective view of an LC optical fiber connector.
FIG. 38 is a front, top right-side perspective view of the LC optical fiber connector of FIG. 37.

Referring now to the drawings, wherein like reference numerals designate identical or corresponding parts throughout the several views, and more particularly to FIGS. 1–3 thereof, an embodiment of the present invention is a pluggable optical transceiver module 10 as shown in therein.

Recently, optical connectors have been made available that are much smaller in diameter. Traditionally, the optical connector ferrule had a diameter of 2.5 mm and was associated with an SC connector. Now, optical connector ferrules can be produced which have a diameter of 1.25 mm, and correspondingly reduced size housings. For example, the LC connector is produced by Lucent Technologies and is incorporated into the LC connector family for both single mode and multi mode fiber type. U.S. Pat. No. 5,481,634 discloses such a connector as discussed above.

However, transceivers that accept LC connectors are not readily available. The pluggable optical transceiver module 10 allows fiber optic cable links having LC connectors to connect to LC receptacles 26, 28 of the pluggable optical transceiver module 10. Another end of the pluggable optical transceiver module 10 has a High Speed Serial Data Connector (HSSDC)1 (see FIG. 3) for connecting to nodes (host device) having ports which accept only copper cable links. Thus, the pluggable optical transceiver module 10 enables fiber optic cable links having LC connectors to be associated with host devices or nodes which only accept copper cable connector links.

FIG. 1 is an exploded perspective view of an embodiment of the pluggable optical transceiver module 10. The pluggable optical transceiver module 10 includes a housing 20 and a cover 80 attachable to the housing 20 and forming a cavity therebetween. Located in the cavity between the housing 20 and the cover 80 are a printed circuit board 40, two optical devices 60, 70 and a holder 50. The housing 20 includes cover latch apertures 22, holder latch apertures 24, LC receptacles 26, 28, and a cantilevered latch or release lever 30. The cover 80 includes latches 82 which snap into place with the cover latch apertures 22 of the housing 20 when the cover 80 is pressed into the housing 20. Additionally, contacts or conductors 90 (see FIG. 2) connect to traces (not shown) on the printed circuit board 40 and including impedance control means. The traces or circuitry have conductive pads (not shown) with which the contacts 90 are in registration. In a preferred embodiment there are eight connectors or contacts 90. The circuit board is further connected to leads 61, 63, 65, 67, 71, 73, 75, 77 of the two optical devices 60, 70.

FIG. 2 is an exploded perspective view of the pluggable optical transceiver module 10 taken from a different perspective than the perspective used in FIG. 1. Further shown are contacts 90 which attach to the printed circuit board 40 and pass through holes 56 of the holder 50. The contacts extend past an edge 58 of the holder 50 and reside in channels 31 of the housing 20.

FIG. 3 is a perspective view of the assembled pluggable optical transceiver module 10 displaying the LC receptacles 26, 28, the High Speed Serial Data Connector (HSSDC)1, and the engagement of the latches 52, 82 with the latch apertures 22, 24.

During assembly, the leads 61, 63, 65, 67 of the optical device 60 are connected to traces of the printed circuit board 40, and leads 71, 73, 75, 77 of the optical device 70 are also connected to traces of the printed circuit board 40. An edge 42 of the printed circuit board 40 is straddled by leads of the optical devices 60, 70 by fitting into a mid-section 62 of the optical device 60 and a mid-section 72 of the optical device 70. The printed circuit board 40 contains signal conditioning electronics (not shown). Contacts 90 are connected to other traces of the printed circuit board 40. An edge 44 of the printed circuit board 40 fits into a recess 54 of the holder 50. An edge 58 of the holder 50 abuts a surface 33 of the housing 20. Side edges 74, 76 of the optical devices 70 slidingly engage with grooves 6, 8 of a LC receptacle cavity 34, and side edges 64, 66 of the optical device 60 slidingly engage with grooves 2, 4 of a LC receptacle cavity 32. The latches 52 of the holder 50 engage the latch apertures 24 of the housing 20. Thus, the contacts 90 reside in the channels 31 of the housing 20. The cover 80 is next brought into engagement with the housing 20. A surface 88 of the cover 80 abuts a surface 59 of the holder 50 and other surfaces 84, 86 of the cover 80 abut portions of the optical devices 60, 70. Latches 82 of the cover 80 engage with the latch apertures 22 of the housing 20, thus securing the assembly. The assembled pluggable optical transceiver module 10 is shown in FIG. 3.

To improve shielding, outer surfaces of the pluggable optical transceiver module 10 can be metallized or metallic. Preferably, the housing 20, the cover 80, the holder 50 are made of a polymer material. Preferably, the printed circuit board 40 is made of glass fibers embedded in a matrix of epoxy, commonly known as FR-4. The polymer material and the FR-4 material are electrically insulative. The conductors 90 are preferably made of nickel over copper. Preferably, one of the two optical devices 60, 70 is a receiver, and a second of the two optical devices 60, 70 is a transmitter.

The High Speed Serial Data Connector 1 is configured to be mateable with a High Speed Serial Data Connector receptacle, where the High Speed Serial Data Connector receptacle is defined by the references and FIGS. 18–30 discussed above.

The LC receptacles 26, 28 are configured to be mateable with LC connectors, where the LC connectors are defined by the references and FIGS. 37–41 discussed above.

Obviously, numerous modifications and variations of the present invention are possible in light of the above teachings. It is therefore to be understood that within the scope of the appended claims, the invention may be practiced otherwise than as specifically described herein.

What is claimed is:

1. A pluggable optical transceiver module comprising:

a housing;

a printed circuit board;

two optoelectronic devices mounted on the printed circuit board; and a High Speed Serial Data Connector connected to the printed circuit board, and wherein the printed circuit board and the two optoelectronic devices are mounted within the housing, and wherein the housing is made of a polymer material.

2. A pluggable optical transceiver module comprising:

a housing;

a printed circuit board;

two optoelectronic devices mounted on the printed circuit board; and a High Speed Serial Data Connector connected to the printed circuit board, and wherein the printed circuit board and the two optoelectronic devices are mounted within the housing, and wherein the housing is metallized, and wherein the housing has two LC optical receptacles formed therein, and wherein a first of the two LC optical receptacles houses a first of the two optoelectronic devices, and wherein a second of the two LC optical receptacles houses a second of the two optoelectronic devices.

3. The pluggable optical transceiver module according to claim 2 wherein the High Speed Serial Data Connector includes multiple conductors connected to circuitry on the printed circuit board, multiple electrical contacts in registration with respective conductive pads of the circuitry, an insulating holder holding the printed circuit board and the electrical contacts, and an insulating housing receiving therein the holder and the electrical contacts and the printed circuit board.

4. The pluggable optical transceiver module according to claim 2 wherein the High Speed Serial Data Connector includes multiple electrical contacts and multiple conductors connected to respective conductive pads of circuitry on the printed circuit board, an insulating holder holding the printed circuit board and the electrical contacts, an insulating housing receiving therein the holder and the electrical contacts, and the printed circuit board being held in the housing.

5. The pluggable optical transceiver module according to claim 2 wherein the High Speed Serial Data Connector includes multiple electrical contacts and multiple conductors connected to respective conductive pads of circuitry on the printed circuit board, an insulating housing receiving therein the holder and the electrical contacts, and the printed circuit board being held in the housing.

6. The pluggable optical transceiver module according to claim 2 wherein the High Speed Serial Data Connector is configured so as to be pluggable with a High Speed Serial Data Connector receptacle of a host device and includes impedance control means.

7. A pluggable optical transceiver module comprising:

a housing;

a printed circuit board;

two optoelectronic devices mounted on the printed circuit board; and a High Speed Serial Data Connector connected to the printed circuit board, and wherein the printed circuit board and the two optoelectronic devices are mounted within the housing, and wherein the housing has two LC optical receptacles formed therein, and wherein a first of the two LC optical receptacles houses a first of the two optoelectronic devices, and wherein a second of the two LC optical receptacles houses a second of the two optoelectronic devices.

8. A pluggable optical transceiver module comprising:

a housing;

a printed circuit board mounted within the housing;

two optoelectronic devices mounted on the printed circuit board, and wherein a first of the two optoelectronic devices is a receiver, and wherein a second of the two optoelectronic devices is a transmitter, and wherein the two optoelectronic devices are mounted within the housing; and a connector connected to the printed circuit board, and wherein the connector is configured to be pluggable with a High Speed Serial Data Connector receptacle of a host device, and wherein the housing is made of a polymer material.

9. The pluggable optical transceiver module according to claim 8 wherein the housing is metallized.

10. A pluggable optical transceiver module comprising:

a housing;

a printed circuit board mounted within the housing;

two optoelectronic devices mounted on the printed circuit board, and wherein a first of the two optoelectronic devices is a receiver, and wherein a second of the two optoelectronic devices is a transmitter, and wherein the two optoelectronic devices are mounted within the housing; and a connector connected to the printed circuit board, and wherein the connector is configured to be pluggable with a High Speed Serial Data Connector receptacle of a host device, and wherein the housing includes a release lever mounted adjacent to the connector, the connector defining a first end and the release lever extending transversely back from the first end and pivotally attached adjacent the first end, and the release lever having a free terminal portion, the free terminal portion of the release lever extending towards a second end of the housing comprising the two optoelectronic devices.

11. A pluggable optical transceiver module comprising:

a housing;

a printed circuit board mounted within the housing;

two optoelectronic devices mounted on the printed circuit board, and wherein a first of the two optoelectronic devices is a receiver, and wherein a second of the two optoelectronic devices is a transmitter, and wherein the two optoelectronic devices are mounted within the housing; and a connector connected to the printed circuit board, and wherein the connector is configured to be pluggable with a High Speed Serial Data Connector receptacle of a host device, and wherein the connector includes eight contacts, and wherein the connector has a width of less than 17.2 mm and height of less than 10.3 mm.

12. An optical to electrical converter comprising:

a first end having an optical plug receptacle configured to receive at least one LC optical plug;

a second end having an electrical connector configured to form a High Speed Serial Data Connector; and an optoelectronic subassembly mounted between the first end and the second end for converting electrical signals to optical signals or optical signals to electrical signals.

* * * * *